(12) United States Patent
Hori et al.

(10) Patent No.: US 6,381,957 B1
(45) Date of Patent: May 7, 2002

(54) VEHICLE TRANSMISSION

(75) Inventors: Yoshiaki Hori; Tohru Nishi; Michio Asumi, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/714,125

(22) Filed: Nov. 17, 2000

(30) Foreign Application Priority Data

Nov. 19, 1999 (JP) .......................................... 11-329345

(51) Int. Cl.[7] .......................... F16D 31/02; F16D 39/00
(52) U.S. Cl. .......................................... 60/436; 60/488
(58) Field of Search .......................... 60/435, 436, 488, 60/489

(56) References Cited

U.S. PATENT DOCUMENTS 5,974,798 A * 11/1999 Eberle et al. ................. 60/435

FOREIGN PATENT DOCUMENTS

JP         11115870         4/1999

* cited by examiner

Primary Examiner—F. Daniel Lopez
Assistant Examiner—Michael Leslie
(74) Attorney, Agent, or Firm—Birch, Stewart, Kolasch & Birch, LLP

(57) ABSTRACT

An engine crankshaft 2 and a wheel drive shaft 5 are connected through a static hydraulic infinitely variable transmission 3. The static hydraulic infinitely variable transmission 3 has a hydraulic pump 20 extending to an engine side of the transmission and a hydraulic motor 21 extending to a wheel drive shaft 5 side of the transmission and connected together using a closed hydraulic circuit. A control clutch 18 is fitted in the transmission system between the hydraulic motor 21 and the wheel drive shaft 5 so that the control clutch is disengaged when the engine is idling and when operation is suspended.

17 Claims, 6 Drawing Sheets

VEHICLE TRANSMISSION

BACKGROUND OF THE INVENTION

1. Field of the Invention

The present invention relates to a transmission for a vehicle such as a motorcycle that is occasionally pushed under human power, and particularly to an improvement in a connection between an engine crankshaft and a wheel drive shaft through a static hydraulic infinitely variable transmission.

2. Background Art

In a transmission of the related art, a centrifugal type starting clutch is interposed between the engine crankshaft and a static hydraulic infinitely variable transmission. As disclosed in Japanese Patent Laid-open No. Hei. 11-115870, when the engine in this arrangement is idling or operation is suspended, the starting clutch is disengaged so that the vehicle can be pushed under human power without engine resistance.

In the above described related art, when the vehicle is pushed under human power when the engine is idling or operation is suspended, a transmission system reaching from a wheel to the centrifugal clutch is rotated. However, since there is a comparatively heavy static hydraulic infinitely variable transmission system included in the transmission, when the vehicle is pushed a large force is required to overcome the large inertial resistance of the static hydraulic infinitely variable transmission and frictional resistance of respective parts.

SUMMARY OF THE INVENTION

The present invention overcomes the shortcomings associated with the related art and achieves other advantages not realized by the prior art.

An object of the present invention is to solve the above-described problems of conventional vehicle transmissions and to provide a vehicle transmission that can be lightly pushed without being affected by the inertial resistance of the static hydraulic infinitely variable transmission when the engine is idling or operation is suspended.

These and other objects are accomplished by a vehicle transmission for operatively connecting to a crankshaft of an engine and a vehicle wheel drive shaft, said transmission comprising a static hydraulic infinitely variable transmission including a connection for connecting said transmission to said crankshaft and a connection for connecting said transmission to said vehicle wheel drive shaft a hydraulic pump extending to an engine side of said transmission a hydraulic motor extending to a wheel drive shaft side of said transmission, wherein said pump and said motor are connected together using a closed hydraulic circuit, and a control clutch arranged in said transmission on said wheel drive shaft side between said hydraulic motor and said connection for said wheel drive shaft, wherein said control clutch is disengaged if said engine is idling and when operation of said engine is suspended.

According to this first aspect, by disengaging the control clutch when the engine is idling or operation is suspended, it is possible to disconnect inverse load from the vehicle wheels to the static hydraulic infinitely variable transmission. Accordingly, in the event that the vehicle is pushed along under the power of just the rider, the vehicle can be relatively lightly operated without being affected by the large inertial resistance of the static hydraulic infinitely variable transmission.

In a second aspect of the present invention, in addition to the first aspect, the control clutch is a hydraulic type that engages using hydraulic pressure derived from an supply oilway connecting between an supply pump driven by the engine and the static hydraulic infinitely variable transmission.

According to this second aspect, by setting the introduction hydraulic pressure to the control clutch it is possible to allow a desired friction bonding force in the clutch, which contributes to reduction in size of the clutch. Furthermore, hydraulic pressure introduced to the control clutch is derived from a supply oilway of the static hydraulic infinitely variable transmission which means that there is no need for a dedicated control clutch oil pump, making it possible to keep cost increases as low as possible.

A third aspect of the present invention, in addition to the second aspect, has an electromagnetic control valve for controlling hydraulic pressure supply to the control clutch fitted in oilways connecting between the supply oilway and the control clutch.

According to the third aspect, the electromagnetic control valve is controlled so as to disconnect or weaken introduction pressure to the hydraulic chamber according to operating conditions of the engine, making it possible to carry out transmission control according to various operating conditions.

These and other objects are accomplished by a static hydraulic infinitely variable vehicle transmission for operatively connecting to a crankshaft of an engine and a vehicle wheel drive shaft, said transmission comprising a connection for connecting said transmission to said crankshaft and a connection for connecting said transmission to said vehicle wheel drive shaft; a hydraulic pump extending to an engine side of said transmission; a hydraulic motor extending to a wheel drive shaft side of said transmission, wherein said pump and said motor are connected together using a closed hydraulic circuit; a control clutch arranged in said transmission on said wheel drive shaft side between said hydraulic motor and said connection for said wheel drive shaft, wherein said control clutch is disengaged if said engine is idling and when operation of said engine is suspended; and a cylinder block rotatably driven according to a sum of reaction torque received from said hydraulic pump and a reaction torque received from said hydraulic motor, wherein said sum is a rotational torque capable of being transmitted through said control clutch to said wheel drive shaft connection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the present invention will be described in detail with reference to the accompanying drawings.

Figure 1:
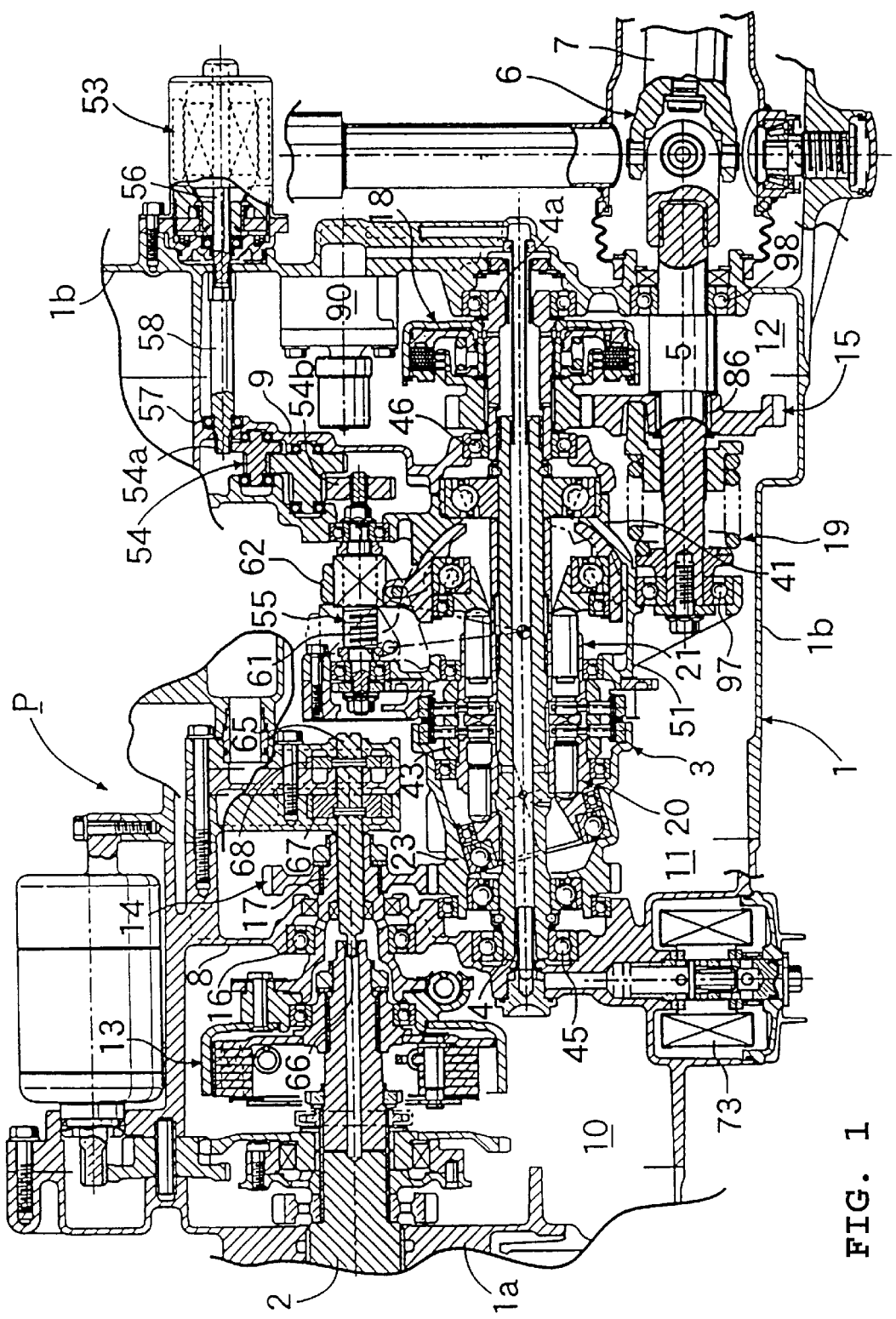
FIG. 1 is a longitudinal plan cross sectional view of a motorcycle transmission according to an embodiment of the present invention.
Figure 2:
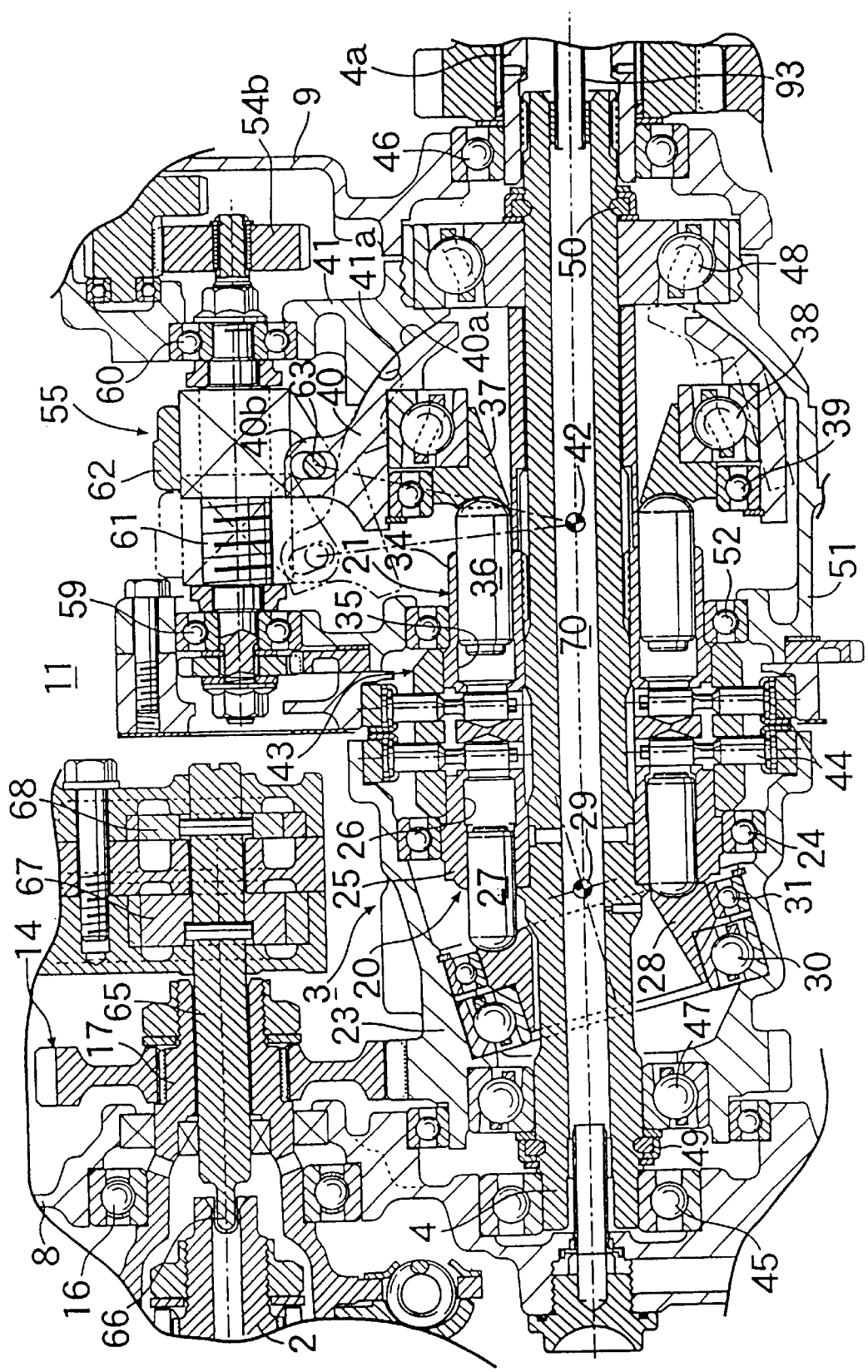
FIG. 2 is an enlarged view around a static hydraulic infinitely variable transmission of the transmission according to an embodiment of the present invention.
Figure 3:
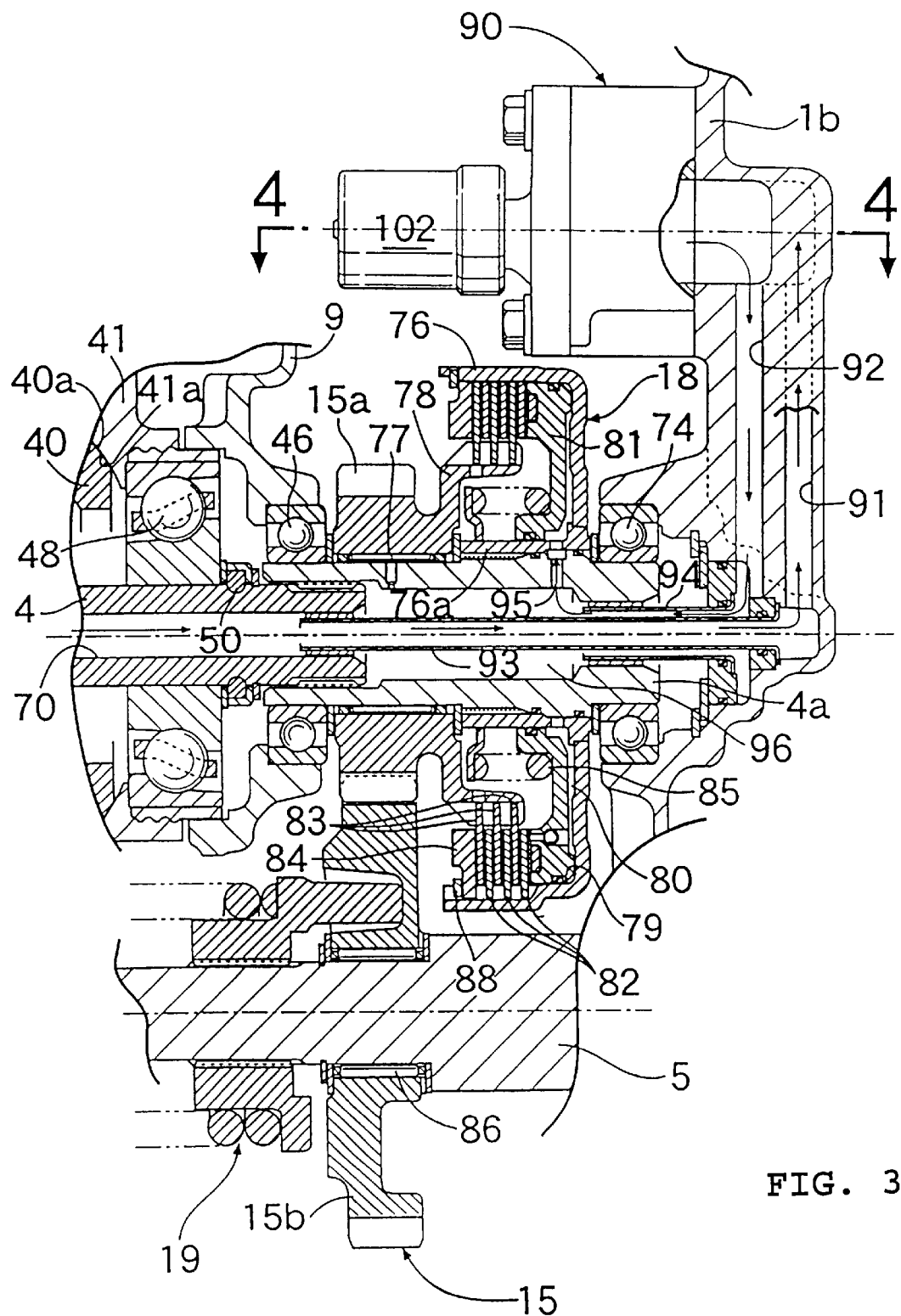
FIG. 3 is an enlarged view around a control clutch of the transmission according to an embodiment of the present invention.
Figure 4:
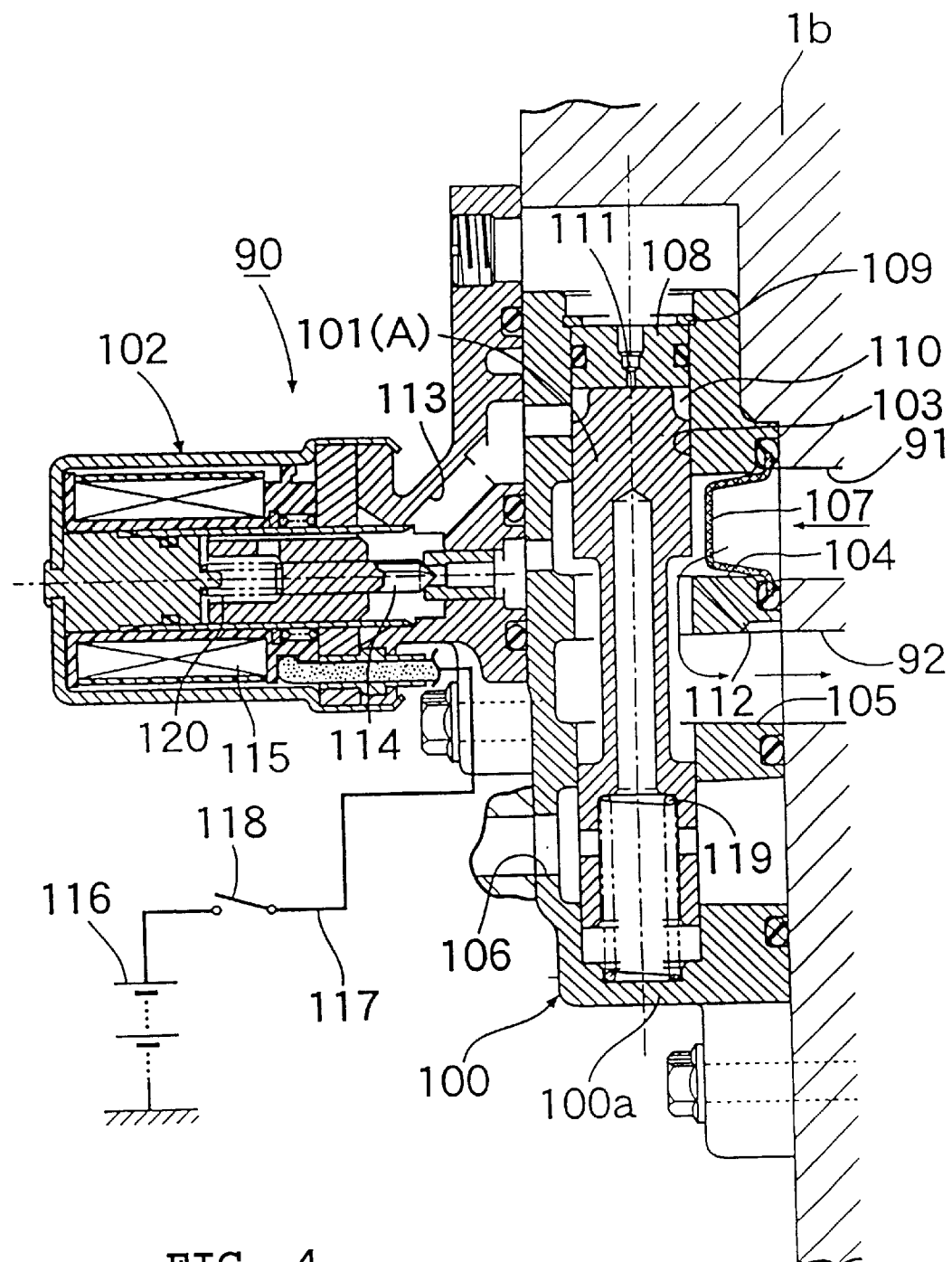
FIG. 4 is a cross sectional view along line 4—4 in FIG. 3.
Figure 5:
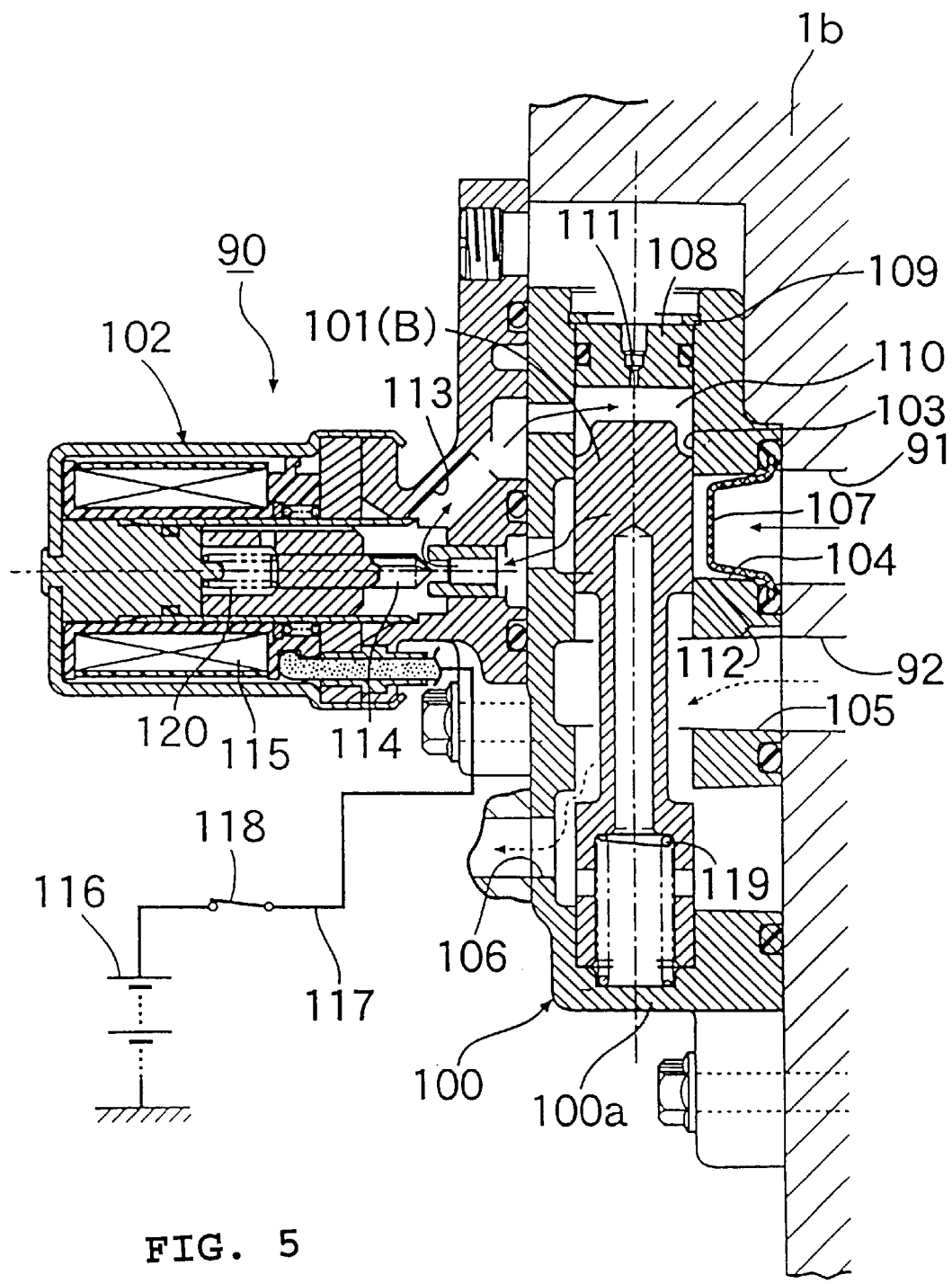
FIG. 5 is an operational drawing corresponding to FIG. 4.
Figure 6:
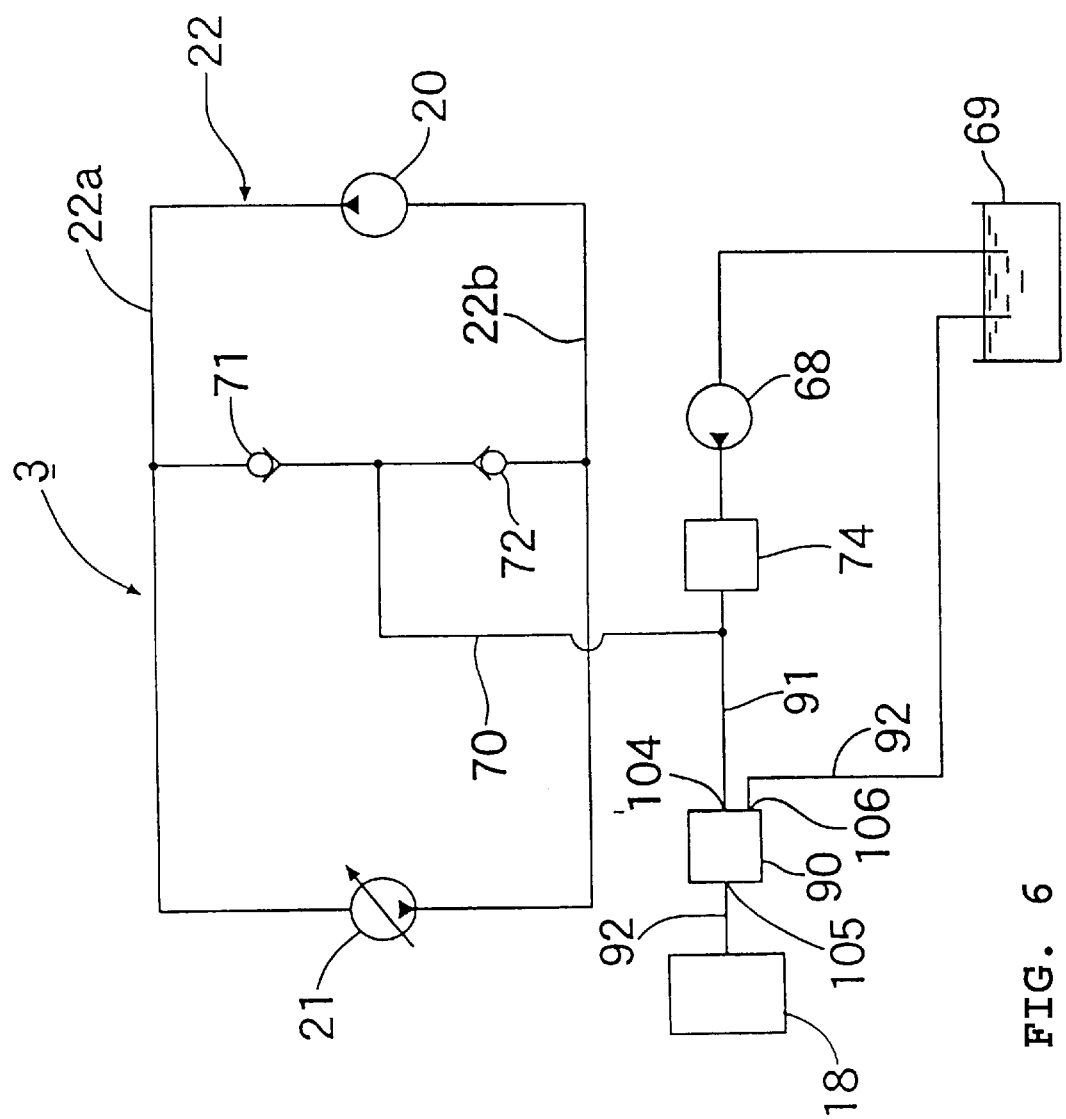
FIG. 6 is a hydraulic circuit diagram for the static hydraulic present invention.

FIG. 1 is a longitudinal plan cross sectional view of a motorcycle transmission according to an embodiment of the present invention. FIG. 2 is an enlarged view around a static hydraulic infinitely variable transmission of the transmission according to an embodiment of the present invention. FIG. 3 is an enlarged view around a control clutch of the transmission according to an embodiment of the present invention. FIG. 4 is a cross sectional view along line 4—4 in FIG. 3. FIG. 5 is an operational drawing corresponding to FIG. 4. FIG. 6 is a hydraulic circuit diagram for the static hydraulic infinitely variable transmission according to an embodiment of the present invention.

As shown in FIG. 1, an engine crankshaft 2, an output shaft 4 of an static hydraulic infinitely variable transmission 3, and a wheel drive shaft are arranged in parallel in the longitudinal direction of the vehicle inside a casing 1 of a power unit P of a motorcycle. A propeller shaft 7 is connected to a rear end of the wheel drive shaft 5 projecting from the casing 1 via universal joint 6, and this propeller shaft 7 is connected to a drive wheel of the motorcycle, preferably the rear wheel.

The casing 1 of the power unit P is formed by joining a transmission case 1b to a rear end of a crankcase 1a supporting the crankshaft 2. Three chambers, a front first clutch chamber 10, a middle gear chamber 11 and a rear second clutch chamber 12 are defined inside the transmission case 1b by a pair of front and rear bulkhead 8 and 9. A centrifugal starting clutch 13 is housed in the first clutch chamber 10. A primary reduction gear 14 and the static hydraulic infinitely variable transmission 3 are housed in the gear chamber 11. A secondary reduction gears 15, control clutch 18 and torque damper 19 are housed in the second clutch chamber 12.

The centrifugal starting clutch 13 is connected between a rear end of the crankshaft 2 projecting into the first clutch chamber 10 and a clutch shaft 17 supported in the bulkhead 8 via a bearing 16 and arranged coaxially with the crankshaft 2. The centrifugal starting clutch is disengaged in an idling range of rotation of the crankshaft 2 and is engaged, passing through a semi-clutched state when this rotation range is exceeded.

As shown in FIG. 1, FIG. 3, and FIG. 6, the static hydraulic infinitely variable transmission 3 comprises a swash plate type hydraulic pump. 20, and a variable displacement swash plate type hydraulic motor 21 connected to the hydraulic pump 20 through a hydraulic closed circuit 22.

The hydraulic pump 20 is provided with an input barrel shaft 23 connected to the clutch shaft 17 via the primary reduction gear 14, a pump cylinder 25 fitted into this input barrel shaft 23 through a bearing 24 so as to rotate with respect to the input barrel shaft 23, a plurality of pump plungers 27 sliding inside a plurality of cylinder 26 in a ring arrangement provided in the pump cylinder 25 so as to encircle the axis of the pump cylinder 25, and a pump swash plate 28 having a front surface coming into contact with an outer end of these pump plungers 27.

The pump swash plate 28 is supported on an inner surface of the input barrel shaft 23 via an angular contact bearing 30 and a radial bearing 31 so a to be maintained at a fixed inclination with respect to the axis of the pump cylinder 25, with a virtual trunnion axis 29 orthogonal to the axis of the pump cylinder 25 as a center.

On the other hand, the hydraulic motor 21 is provided with a motor cylinder 34 arranged coaxially above the pump cylinder 25, motor plungers 36 sliding inside a plurality of cylinder holes 35 arranged in a ring in the motor cylinder 34 so as to encircle the axis of the motor cylinder 34, a swash plate 37 having a front end coming into contact with these motor plungers 36, and a motor swash plate holder 40 supporting a rear surface of the swash plate 37 via an angular contact bearing 38 and a radial bearing 39.

The motor swash plate holder 40 is supported on the rear surface of a motor swash plate anchor wall 41. Contact surface 40a and 41a of the motor swash plate holder 40 and the motor swash plate anchor wall 41, respectively coming into contact with each other, form a cylindrical surface having a virtual trunnion axis 42 orthogonal to the axis of the motor cylinder 34 as a center, and the motor swash plate holder 40 can rotate around the virtual trunnion axis 42 while the two contact surfaces 40a and 41a slide relative to each other.

The pump cylinder 25 and the motor cylinder 34 are joined together to form a single cylinder block 43, and a distributing valve 44 for performing transfer of hydraulic pressure between the pump cylinder 25 and the motor cylinder 34 is provided in this cylinder block 43. Also an output shaft 4 is spline fitted to the cylinder block 43 passing through a central part thereof.

A front end of the output shaft 4 is supported in the front bulkhead 8 via a bearing 45 and a rear end of the output shaft 4 is supported in the rear bulkhead 9 via a bearing 46 together with an output extension shaft 4a spline fitted to the output shaft 4.

The output shaft 4 also supports the input barrel shaft 23 and the motor swash plate anchor wall 41 between the two bulkheads 8 and 9, via respective angular contact bearings 47 and 48. The motor swash plate anchor wall 41 is also connected to the rear bulkhead 9.

The above described angular contact bearings 47 and 48 are prevented from moving in the axial direction by respective check rings 49 and 50 fitted onto the output shaft 4, and prevent a thrust load generated between the pump swash plate 28 and the swash plate 37 from acting on the output shaft 4.

The cylinder block 43 is supported in a cylinder block holder 51 integrally formed with the motor swash plate anchor wall 41, via a bearing 52. The motor swash plate holder 40 has an arm 40b at one end. An electric motor 53 capable of forward and reverse rotation is connected to this arm 40b via a reduction gear 54 and a ball screw mechanism 55.

The two ends of the wheel drive shaft 5 are rotatably supported by a cylinder block holder 51 and the transmission case 1b rear wall, via bearings 97 and 98.

The electric motor 53 is attached to a rear wall of the transmission case 1b. A tip of a rotor shaft 56 of the electric motor 53 projects into the transmission case 1band is connected to an intermediate shaft 58 supported in the rear bulkhead 9 via a bearing 57. A drive gear 54a of the reduction gear 54 is formed on a tip of the intermediate shaft 58.

The ball screw mechanism 55 comprises a screw shaft 61 rotatably supported in the rear bulkhead 9 and the cylinder block holder 51 via bearings 59 and 60, and a nut member 62 screwed onto the screw shaft 61. A driven gear 54b of the reduction gear 54 is fixed to the screw shaft 61, and the arm 40b is connected to the nut number 62 using a pin 63.

Specifically, if the rotor shaft 56 of the electric motor 53 is caused to rotate backwards and forwards, this rotation is reduced and converted to movement in the axial direction of the nut member 62. The movement of the nut member 62 enables the swash plate 37 to be tilted between a vertical position orthogonal to the axis of the output shaft 4 and a maximum tilt position where it is fully tilted from the vertical position. At the vertical position, the displacement of the hydraulic motor 21 is zero, while at the maximum tilt position the displacement is maximum.

A pump shaft 65 through which the clutch shaft 17 rotatably passes is connected to the crankshaft 2 via a joint 66, and a pair of rotational pumps 67 and 68 driven by this pump shaft 65 are attached to the transmission case 1b. One of the pumps 67 is a lubrication oil pump for supplying lubricating oil to respective part of the engine, while the other pump 68 is a supply pump for taking in oil inside a reservoir 69 at a lower part of the transmission case 1b and supplying this oil to the static hydraulic infinitely variable transmission 3.

As shown in FIG. 6, the supply passageway 70 extending from a discharge port of the supply pump 68 is divided in two at a downstream side, and is connected to an outward passageway 22a and a return passageway 22b of the hydraulic closed circuit 22 between the hydraulic pump 20 and the hydraulic motor 21. Check valves 71 and 72 for preventing reverse flow are provided in each of the connecting sections.

An oil filter 73 is also fitted in the supply path 70. As shown in FIG. 1 and FIG. 2, the downstream section of the supply path 70 is formed so as to pass through the center of the output shaft 4, and the oil filter 73 is removably mounted on the transmission case 1b.

If the input barrel shaft 23 is rotatably driven from the clutch shaft 17 via the primary reduction gear 14, the pump swash plate 28 alternately subjects the pump plungers 27 to discharge and intake strokes. High pressure hydraulic oil discharged to the pump plunger in a discharge stroke passes through the outgoing path 22a and is supplied to cylinder holes 35 of the motor plunger present in an expansion stroke region, while low pressure hydraulic oil discharged by the motor plunger 36 present in a compression stroke region is taken in to cylinder holes 26 of a pump plunger 27 undergoing an intake stroke, through the return path 22b. In this way, hydraulic pressure is transferred between the hydraulic pump 20 and the hydraulic motor 21. If there is leakage of hydraulic oil from the hydraulic closed circuit 22 during this time the low pressure return path 22b side check valve 72 is opened so as to compensate for the leaked portion and to supply hydraulic oil discharged from the supply pump 68 to the return path 22b. At the time of engine braking, the functions of the hydraulic pump 20 and the hydraulic motor 21 are reversed, which means that the replenishment of hydraulic oil is carried out through the other check valve 71.

The cylinder block 43 is rotatably driven according to the sum of the reaction torque received from the pump plunger of the pump cylinder in a discharge stroke and the reaction torque received from the motor swash plate 37 through the motor plunger 36 of a motor cylinder 34 in an expansion stroke. This rotational torque is transmitted to the wheel drive shaft 5 through the control clutch 18, the secondary reduction gear 15 and the torque damper 19.

The gear ratio of the static hydraulic infinitely variable transmission 3 is determined by the displacement ratio of the hydraulic motor 21 and the hydraulic pump 20. Therefore, by causing the motor swash plate 37 to tilt from a vertical position to a fully tilted position using drive by the electric motor 53, the displacement of the hydraulic pump 20 is controlled from zero to maximum making it possible to control the gear ration from 1 to a maximum value in a stepless manner.

As shown in FIG. 3, the output extension shaft 4a spline fitted to a rear end of the output shaft 4 is supported in the rear bulkhead 9 and a rear wall of the transmission case 1b via bearings 46 and 74. The control clutch 18 comprises a cylindrical clutch outer 76 having a bottom and having a boss 76a spline fitted to the output extension shaft 4a, a clutch outer 78 relatively rotatably supported on the output extension shaft 4a via a bearing 77 and having an inner end concentrically arranged inside the clutch outer 76, a compression piston 81 slidably fitted into a cylinder hole formed in the clutch outer 76 and defining a hydraulic chamber 80 between and end wall of the clutch outer 76, a plurality of drive friction plates 82 adjacent to the compression piston 81 and spline fitted to an inner surface of the clutch outer 76 so as to be capable of sliding, a plurality of driven friction plates 83 arranged on top of these drive friction plates and each other and spline fitted to an outer surface of the clutch inner 78 so as to be capable of sliding, a pressure plate 84 positioned between these sets of drive friction plates and driven friction plates 82 and 83 and facing the compression piston 81, and a return spring 85 for urging the compression piston 81 to the hydraulic chamber 80 side.

The pressure plate 84 is spline fitted to an inner surface of the clutch outer 76 and is fixed to the clutch outer 76 using a stop ring 88. A drive gear 15a of the secondary reduction gear 15 is integrally formed on the outer end of the clutch inner 78. A driven gear 15b of the secondary reduction gear 15 is relatively rotatably supported on the wheel drive shaft 5 via a bearing 86 and is connected to the wheel drive shaft 5 via the torque damper 19.

The output extension shaft 4a is made hollow, and an input oilway 91 and an output oilway 92 opened and closed under control of the electromagnetic control valve 90 are provided in a rear wall of the transmission case 1b. A first introduction pipe 93 passing through the hollow part of the output extension shaft 4a and communicating with the supply oilway 70 of the output shaft 4 and the input oilway 91 is supported on the output shaft 4 and in the rear wall of the transmission case 1b.

A hollow section of the output extension shaft 4a around the first introduction pipe 93 forms an oil chamber 96 isolated from the supply oilway 70 of the output shaft 4. This oil chamber 96 communicates with the hydraulic chamber 80 of the control clutch 18 via a through hole 95. The oil chamber 96 also communicates with an output oilway 92 via a second introduction pipe 94 surrounding the first introduction pipe 93. The second introduction pipe 94 is supported on the output extension shaft 4a and in the rear wall of the transmission case 1b.

As shown in FIG. 4 and FIG. 5, the electromagnetic control valve 90 comprises a valve housing 100 joined to a rear wall of the transmission case 1b, a spool valve body 101 for controlling pilot hydraulic pressure so as to actuate the spool valve body 101.

The valve housing 100 is provided with a valve hole 103 into which the spool valve body 101 is slidably fitted, an input port 104 and an output port 105 opening to the valve hole 103 respectively through the input oilway 91 opening and the output oilway 92, and an exhaust port 106 for opening the valve hole 103 to the inside of the transmission case 1b. A filter 107 is fitted in the input port 104.

One end of the valve hole 103 is blocked off by an end wall 100a integral with the valve housing 100, while the other end of the valve hole 103 is blocked off by a plug fitted into the inner surface of the valve hole so as to be oil tight and fixed using an engagement ring 109. The sliding stroke of the spool valve body 101 is regulated by the end wall 100a and the plug 108. The spool valve body 101 communicates between the input port 104 and the output port 105 and isolates between the output port 105 and the exhaust port 106 at a first position A (refer to FIG. 4) in contact with the plug 108, while isolating between the input port 104 and the output port 105 and communicating between the output port 105 and the exhaust port 106 at a second position B (refer to FIG. 5) in contact with the rear wall 100a.

The spool valve 101 also defines a pilot hydraulic chamber in the valve hole 103 between the plug 108. An orifice-shaped leakage hole 111 for opening the pilot hydraulic chamber into the transmission case 1b is provided in the plug 108, and a valve spring 119 for urging the spool valve 101 to the first position A side, namely the pilot hydraulic chamber 110 side, is housed in the valve hole 103. An orifice 112 normally communicating between the input port 104 and the output port 105 is provided in the valve housing 100.

The electromagnetic valve 102 is provided with a communicating path 113 communicating between the input port 104 and the pilot hydraulic chamber 110, a needle valve 114 for opening and closing this communicating path 113, a closing spring 120 for urging this needle valve 113 in the closing direction, and a coil 115 for opening the needle valve 114 when energized. An engine speed detector switch 118 is inserted into an electrical path lining between the coil 115 and a battery 116, and this switch 118 is configured so as to be normally open, and close when the engine speed falls below a predetermined idling speed.

Operation of this embodiment will now be described with reference to the accompanying drawings. When the engine is running faster than the idling speed, the normally open engine speed detector switch 118 is in the off state, as shown in FIG. 4 and so the needle valve 114 is isolated from the communication path 113 by the electromagnetic valve 102 and the supply of hydraulic oil from the input port 104 to the pilot hydraulic chamber 110 is severed. This results in the spool valve body 101 being subjected to the urging force of the valve spring 119 and to push oil of the pilot hydraulic chamber 110 out from the leakage hole 111 and occupy the first position A.

With the valve body at position A, as described above, there is communication between the input port 104 and the output port 105, and no communication between the output port 105 and the exhaust port 106. Accordingly, hydraulic oil inside the supply oilway of the input port 104 passes sequentially through the first introduction pipe 93, the input oilway 91, the input port 104, the output port 105, the output oilway 92, the second introduction pipe 94, the oil chamber 96, and the through hole 95 to reach the hydraulic chamber 80 of the control clutch 18.

The compression piston 81 is consequently subjected to the introduced hydraulic pressure and advances against the force of the return spring 85, and the groups of drive and driven friction plates 82 and 83 are gripped between the compression piston 81 and the pressure plate 84, thus causing and 82 thereby engaging the control clutch 18.

Accordingly, drive force transmitted from the crankshaft 2 of the engine to the starting clutch 13, primary reduction gear 14 and static hydraulic infinitely variable transmission 3 is conveyed from the output shaft 4 through the engaged control clutch 18 to the secondary reduction gear 15, and further sequentially conveyed to the torque damper 19, wheel drive shaft 5 and propeller shaft 7 for driving the rear wheel.

Next, if the engine speed falls below the predetermined idling speed, the engine speed detection switch 118 is turned on, as shown in FIG. 5. The coil 115 is therefore energized by the electromagnetic valve 102 and the needle valve 114 is excited and caused to open thereby operatively connecting the communication path 113. In this way, hydraulic pressure transmitted from the supply oilway 70 to the input oilway 91 passes from the input port 104 through the communicating path 113 and is introduced into the pilot hydraulic chamber 110, and an amount of oil introduced into the chamber 110 is far in excess of the flow amount from the leakage hole 111. The chamber 110 is immediately pressurized and the spool valve body 101 is moved to the position B against the urging force of the valve spring 119. As a result of this movement of the spool valve body 119, communication between the input port 104 and the output port 105 is interrupted, and communication is established between the output port 105 and the exhaust port 106. Hydraulic oil that has been present in the hydraulic chamber 80 of the control clutch 18 up to that point is released from the output port 105 to the exhaust port 106.

Accordingly, the compression piston 81 retreats under response to the urging force of the return spring 85, the drive and driven friction plates 82 and 83 are respectively freed to release the friction bonds between the two types of plates, and the control clutch 18 is thereby disengaged.

When the engine is idling, because the control clutch 18 is disengaged, a reverse load from the rear wheel is no longer transmitted to the static hydraulic infinitely variable transmission 3. In the event that the vehicle is pushed along by the rider themselves, the static hydraulic infinitely variable transmission having a large interval load is not turned or engaged. It is therefore possible to push the vehicle relatively easily with the use of human power.

Also when the spool valve body 101 is at the second position B, there is communication between the input port 105 and the output port 106 through the orifice 112, which means that hydraulic oil continues to flow slightly from the input port 104 to the output port 105. When the spool valve body has been switched from the second position B to the first position A, hydraulic supply to the hydraulic chamber 80 of the control valve 18 is accelerated, and the responsiveness of engaging the control clutch is further improved.

On the other hand, when operation of the engine is stopped, operation of the supply pump 68 driven by the crankshaft 2 is also stopped. The discharge pressure of the pump 68 is thereby reduced due to lowering of the hydraulic pressure to the hydraulic chamber 80 of the a control clutch 18 from the supply oilway 70, even though the electromagnetic valve 102 is open. Therefore, similarly to when the engine is idling, it is possible for the rider themselves to push the vehicle relatively easily when the vehicle engine is stopped.

Since the control clutch 18 for communicating between the static hydraulic infinitely variable transmission 3 and the wheel drive shaft 5 is constructed as a hydraulically actuated type engaged by introduction of hydraulic pressure to the hydraulic chamber 80, it is possible to apply a desired friction bonding force between the drive and driven friction plates 82 and 83 by setting the introduced hydraulic pressure. The control clutch 18 can then be made relatively smaller in size than those encountered in the conventional art.

Furthermore, hydraulic pressure introduced to the hydraulic chamber of the control clutch 18 is derived from the supply oilway 70 of the static hydraulic infinitely variable transmission 3. Therefore, a dedicated oil pump for the control clutch 18 is not necessary and it is possible to reduce manufacturing and replacement costs even further.

Since the hydraulic pressure introduction to the hydraulic chamber 80 of the control clutch 18 is controlled by the electromagnetic control valve 90, it is even possible to control the electromagnetic valve 90 so that the hydraulic pressure to the hydraulic chamber 80 is isolated or reduced in response to additional engine operating conditions, even when the engine is running outside the idling range.

For example, when the vehicle is decelerating and/or while making practical use of the engine braking effect, if the engine braking effect is too large or exceeds a predetermined limit, the bonding force of the control clutch can be weakened/reduced so that slip occurs between the drive and driven friction plates 82 and 83. Accordingly, it is possible to protect the engine and parts of the transmission against excessive loading. Also, at the time of starting, it is possible for the control clutch 18 to be used as a starting clutch by duty cycle control of the excitation to the electromagnetic valve 102. When this is done, it is possible to do away with the centrifugal starting clutch.

According to the above described aspects of the present invention, since there is provided a vehicle transmission with an engine crankshaft and a wheel drive shaft connected through a static hydraulic infinitely variable transmission having a hydraulic pump extending to an engine side, and a hydraulic pump extending to a wheel drive shaft side, connected together using a hydraulic closed circuit and a control clutch, it is possible to disconnect the transmission from reverse loading from a wheel to a static hydraulic infinitely variable transmission by disengaging the control clutch, even if the engine is idling or stopped. Accordingly, if the vehicle is pushed by the rider themselves, it can be lightly pushed without the effect of a large inertial resistance of the static hydraulic infinitely variable transmission.

Since the control clutch is a hydraulic type that engages using hydraulic pressure derived from a supply oilway connecting between a supply pump driven by the engine and the static hydraulic infinitely variable transmission, by setting the introduction hydraulic pressure to the control clutch it is possible to allow a desired friction bonding force in the clutch which will contribute to reduction in the size of the clutch. Furthermore, hydraulic pressure introduced to the control clutch is derived from a supply oilway of the static hydraulic infinitely variable transmission which means that there is no need for a dedicated control clutch oil pump, thereby making it possible to lower maintenance and manufacture costs as low as possible.

In addition, since there is an electromagnetic control valve for controlling hydraulic pressure supply to the control clutch fitted in oilways connecting between the supply oilway and the control clutch, the electromagnetic control valve is controlled so as to disconnect or weaken introduction pressure to the hydraulic chamber according to operating conditions of the engine, thereby making it possible to carry out transmission control according to various operating conditions.

The present invention is not limited to the above described embodiment, and various design modifications are possible without departing from the spirit and scope of the invention as disclosed in the claims. Such variations are not to be regarded as a departure from the spirit and scope of the invention, and all such modifications as would be obvious to one skilled in the art are intended to be included within the scope of the following claims.

What is claimed is:

1. A vehicle transmission for operatively connecting to a crankshaft of an engine and a vehicle wheel drive shaft, said transmission comprising:

a static hydraulic infinitely variable transmission including a connection for connecting said transmission to said crankshaft and a connection for connecting said transmission to said vehicle wheel drive shaft, a hydraulic pump extending to an engine side of said transmission, a hydraulic motor extending to a wheel drive shaft side of said transmission, wherein said pump and said motor are connected together using a closed hydraulic circuit, and a control clutch arranged in said transmission on said wheel drive shaft side between said hydraulic motor and said connection for said wheel drive shaft, wherein a valve is operative to disengage said control clutch if said engine is idling and when operation of said engine is suspended.

2. The vehicle transmission according to claim 1, wherein the control clutch is a hydraulic clutch.

3. The vehicle transmission according to claim 2, wherein the control clutch engages using hydraulic oil pressure derived from a supply oilway.

4. The vehicle transmission according to claim 3, wherein said supply oilway forms a connection between a supply pump driven by the engine and said static hydraulic infinitely variable transmission.

5. The vehicle transmission according to claim 3, wherein said valve is an electromagnetic control valve for controlling a supply of pressurized hydraulic oil to the control clutch arranged in oilways extending between the supply oilway and the control clutch.

6. The vehicle transmission according to claim 1, wherein the hydraulic pump is a swash plate type hydraulic pump and the hydraulic motor is a variable displacement swash type hydraulic motor.

7. The vehicle transmission according to claim 1, wherein said hydraulic pump includes an input barrel shaft connected to a clutch shaft of a starting clutch;

a pump cylinder fitted into the input barrel shaft;

a plurality of pump plungers slidingly engaging a plurality of cylinders in said pump cylinder; and a pump swash plate.

8. The vehicle transmission according to claim 7, wherein the pump swash plate includes a front surface coming into contact with outer ends of the pump plungers.

9. The vehicle transmission according to claim 8, wherein the hydraulic motor includes a motor cylinder;

motor plungers slidingly engaging a plurality of cylinder holes arranged in a ring within said motor cylinder;

a swash plate having a front end coming into contact with said motor plungers; and a motor swash plate holder supporting a rear surface of said swash plate.

10. The vehicle transmission according to claim 9, wherein said motor swash plate holder is supported on a rear surface of a motor swash plate anchor wall.

11. The vehicle transmission according to claim 10, wherein contact surfaces of the motor swash plate folder and the motor swash plate anchor wall form a cylindrical surface having a virtual trunnion axis orthogonal to a longitudinal axis of the motor cylinder.

12. The vehicle transmission according to claim 9, wherein the pump cylinder and the motor cylinder are joined together to form a single cylinder block, said cylinder block including a distributing valve for performing transfer of hydraulic pressure between the pump cylinder and the motor cylinder.

13. The vehicle transmission according to claim 8, wherein said pump swash plate is supported on an inner surface of said input barrel shaft via an angular contact bearing and a radial bearing so as to be maintained at a fixed inclination with respect to a longitudinal axis of said pump cylinder.

14. The vehicle transmission according to claim 13, wherein said pump swash plate has a virtual trunnion axis orthogonal to said longitudinal axis.

15. The vehicle transmission according to claim 1, wherein the hydraulic motor includes a motor cylinder;

a motor plungers slidingly engaging a plurality of cylinder holes arranged in a ring within said motor cylinder;

a swash plate having a front end coming into contact with said motor plungers; and a motor swash plate holder supporting a rear surface of said swash plate.

16. A static hydraulic infinitely variable vehicle transmission for operatively connecting to a crankshaft of an engine and a vehicle wheel drive shaft, said transmission comprising:

a connection for connecting said transmission to said crankshaft and a connection for connecting said transmission to said vehicle wheel drive shaft;

a hydraulic pump extending to an engine side of said transmission;

a hydraulic motor extending to a wheel drive shaft side of said transmission, wherein said pump and said motor are connected together using a closed hydraulic circuit;

a control clutch arranged in said transmission on said wheel drive shaft side between said hydraulic motor and said connection for said wheel drive shaft, wherein a valve is operative to disengaged said control clutch if said engine is idling and when operation of said engine is suspended; and a cylinder block rotatably driven according to a sum of reaction torque received from said hydraulic pump and a reaction torque received from said hydraulic motor, wherein said sum is a rotational torque capable of being transmitted through said control clutch to said wheel drive shaft connection.

17. The transmission according to claim 16, wherein said valve is an electromagnetic control valve for controlling a supply of pressurized hydraulic oil to the control clutch arranged in oilways extending between a supply oilway and the control clutch.

* * * * *